COE & SNIFFEN.
Skate Fastening.
No. 3,333.
Reissued March 23, 1869.
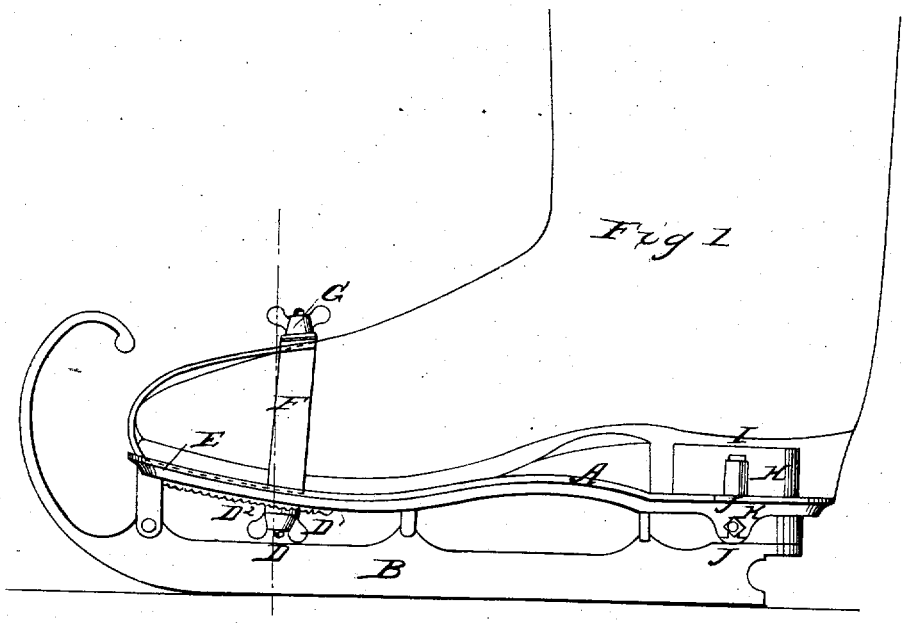
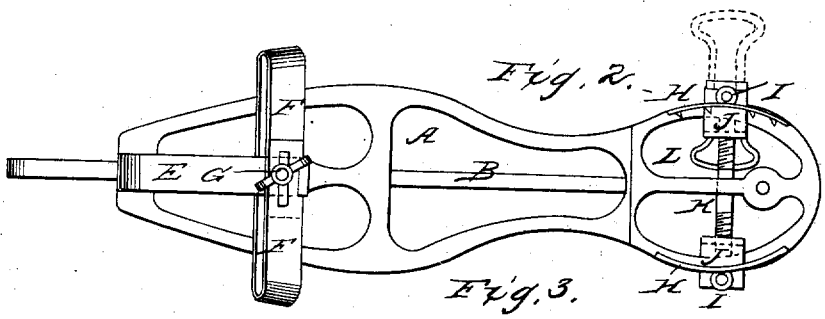
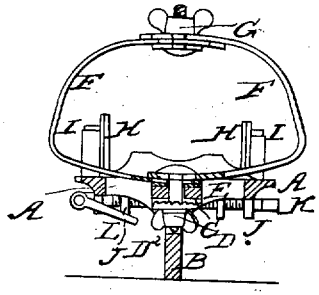
Witnesses:
Grac Curtis
Claudius B. Curtis
Inventor:
J. H. Coe.
W. B. Sniffer
N. PETERS, Photo-Lithographer, Washington, D. C.

UNITED STATES PATENT OFFICE.

E. H. BARNEY AND JOHN BERRY, OF SPRINGFIELD, MASS., ASSIGNEES, BY MESNE ASSIGNMENTS, OF JOHN COE, ADMINISTRATOR OF THE ESTATE OF JOHN H. COE, DECEASED, AND WILLIAM B. SNIFFEN.

SKATE-FASTENING.

Specification forming part of Letters Patent No. 23,826, dated May 3, 1859; Reissue No. 3,333, dated March 23, 1869.

*To all whom it may concern:*

Be it known that JOHN H. COE and W. B. SNIFFEN, both of Stratford, in the county of Fairfield and State of Connecticut, have invented a new and useful Improvement in Skates; and the following is hereby declared to be a full, clear, and exact description thereof, which will enable those skilled in the art to make and use the same, reference being had to the accompanying drawings, forming part of this specification, in which drawings—

Figure 1 is a side elevation of the improved skate attached to a person's foot. Fig. 2 is a top view of the same detached from the foot. Fig. 3 is a vertical transverse section of the skate at the line 1 2 of Fig. 1.

Similar letters indicate corresponding parts.

The skeleton base or foot plate A is secured to the runner B in the usual or most approved manner, and is perforated at its front portion with a longitudinal slot, C, through which is passed, from above, the square portion of the shank of a screw-bolt, D, which also passes through the curved and slightly-elastic bars E F F, arranged immediately above the plate A, and upon which bars E F the head of said bolt D is made to press, as will be hereinafter described, the said bar E having a square slot or opening in it to receive said bolt, and the bars F F having longitudinal slots in them for the same purpose, such slots permitting, also, the adjustment of the bars F F upon each other.

The lower portion of the bar E, which is next the base or foot plate A, extends forward over the slot C in said plate the required distance to suit the length of foot, and is bent upward and backward in a curve corresponding with a curvature of the part of the foot it is intended to embrace until it reaches a point immediately above its lower end, when it is bent over the edges of the transverse curved bars F. These bars F correspond, respectively, with the right and left sides of the portion of the foot they are intended to jointly surround, and their upper and lower ends overlap each other immediately above the upper and lower ends of the bar E, their slots being at right angles to the slot C in the base or foot plate A.

The square portion of the screw-bolt D, before mentioned, passes through the slots at the lower ends of the curved bars F, as well as through the square opening in the lower end of the longitudinal curved bar E and through the slot C in the base or foot plate, and its screw end is provided with a thumb-nut, $D^1$, between which and the lower surface of the base or foot plate A, which is notched or serrated next the slot C, as shown in Fig. 1, and also in Fig. 3, is placed a correspondingly notched or serrated washer, $D^2$, which surrounds the square portion of the bolt D. This arrangement allows the three bars E F F to be moved forward or backward, and to be suitably adjusted and secured in the proper position, and also allows the lower overlapping ends of the bar F to be slid one over the other to suit the form of the foot to be embraced between them, and to be secured firmly at any desired point. The upper ends of the bars E F are also provided with a screw-bolt and thumb-nut, G, and a washer for securing them together when set.

The letter H designates clamps arranged at that part of the base-plate where the foot is intended to rest, and their outer portions, midway between their ends, are provided with journal-boxes or sockets, through which pass upright studs I, upon which the clamps turn. The studs I are secured at their lower ends to the outer ends of slides J, fitted and moving in depressions in the upper surface of the base or foot plate A. The opposite inner ends of the slides J are bent downward at right angles, and are tapped to receive a screw formed on a horizontal transverse screw-shaft, K, which also passes through openings or spaces formed in lugs projecting downward from the sides of the base or foot plate and through an opening in a corresponding lug at the center thereof, immediately above the skate-runner B, on either side of which center lug the said screw-shaft K is provided with shoulders for holding it in place.

This part of the invention is, in this example, applied to the heel of a skate, but is equally applicable to the front or toe part, the clamps being adapted to the size and shape of that part of any sole to which they may be attached, and enables one to attach a skate to the foot by using only the edges of the bottom of the boot or shoe as surfaces to receive the pressure of the fastening device.

The invention further consists in making that part of the surface of a clamp which comes in contact with the sole rough or with a raised surface, or with points or projections thereon, so that when the clamps are tightened for skating they will not slip from their place on the edge of the sole.

The screw-shaft can be turned by any of the ordinary devices for turning screws; but in order to retain with the skate at all times the means for fastening and unfastening it, a handle is hinged to one end of the screw-shaft in such a manner that it can be folded down under the foot-plate after the skate is secured to the foot, as will be next described.

One end of the screw-shaft K is flattened and rounded off, and to such end is hinged a handle, L, by a pin secured to the shaft and passing loosely through openings in the similarly flattened and rounded ends of said handle L, on the side of one of whose flattened ends is formed a triangular cog or cam, which is caused to enter corresponding depressions made in the adjoining flat surface of the screw-shaft both above and below the hinge-pin, so as to enable the elasticity of the handle L, which is, in this example, formed of a rod bent into the shape represented in the drawings, its two ends embracing the end of the shaft K, to force the said cog or cam into the depressions and hold the said handle stationary when it is extended to a horizontal position, as represented by lines in Fig. 2, or when it is pressed under the heel portion of the base or foot plate, out of the way of the ice when the foot is bent over in skating, as represented in Fig. 3, and yet admit of its being moved from either position by the force of the fingers.

After the curved bars E F at the front have once been adjusted to the foot and set by the thumb-nuts and bolts $D^1$ G, they need not necessarily (except in very particular cases) be disturbed in order to put the skate off and on. To effect this adjustment it is only necessary for the person to place his foot within the said bars E F after being unclamped, and bring the front and heel part of the foot in the proper relation to the front and heel of the skate, and then draw the curved bar E and side bars, F, over the toes and the sides of the front of the foot, and, when made to embrace the foot with the required degree of tightness, to firmly secure them by the thumb-nuts $D^1$ G and the screw-bolts. When these front bars are thus properly adjusted and secured and the front of the foot is thrust forward between them with the required degree of pressure to cause them to firmly embrace it, the screw-shaft K is turned by its handle L and made to draw the clamps H together, and their rough surfaces are thus made to embrace the heel of the boot with the required force to firmly hold this portion of the skate to the foot. After the clamps are drawn up, the handle L of the screw-shaft K is turned down out of the way under the base or foot plate A, from which position it can be easily withdrawn by the fingers.

The rough surfaces of the clamps can be formed in any manner preferred by the maker, the object being to penetrate the leather with the projections or points of the clamps and gripe the edge of the sole and prevent the clamps from slipping. The use of such surfaces enables one to fasten the skate with less pressure on the clamps than would be required if the clamps were smooth or plain.

Instead of forming serrations or notches on the lower surface of the foot or base plate A, next the slot C, and on the washer next the same, these surfaces may be made smooth, if desired.

Having thus described this invention, what is claimed as new, and is desired to protect by Letters Patent, is—

1. The combination, with a skate, of a movable clamp and a screw arranged transversely to the skate, for pressing the clamp against the foot or the sole of a boot or shoe, substantially as described.

2. A skate-clamp having a raised or roughened surface, or the equivalent thereof, to hold the edge of the sole of a boot or shoe with a firm gripe, substantially as described.

3. The arrangement of a skate-clamp upon a vertical stud or pivot, on which it can turn so as to adjust itself automatically to the surface against which the clamp is drawn, substantially as shown and described.

4. The curved adjustable slotted bars E F F, combined and arranged in relation to each other and to the foot or base plate A, substantially as and for the purpose described.

5. The arrangement on the screw-shaft K of a hinged handle, L, in such a manner that it can be folded out of the way after the skate is fastened to the foot, substantially as shown and described.

E. H. BARNEY.
JOHN BERRY.

Witnesses:
T. A. CURTIS,
F. S. FULLER.